US011153411B2

(12) United States Patent
Dipin

(10) Patent No.: US 11,153,411 B2
(45) Date of Patent: Oct. 19, 2021

(54) METHOD AND APPARATUS FOR PROCESSING USER REQUEST

(71) Applicant: Samsung Electronics Co., Ltd., Suwon-si (KR)

(72) Inventor: Kollencheri Puthenveettil Dipin, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 15/948,275

(22) Filed: Apr. 9, 2018

(65) Prior Publication Data
US 2018/0295209 A1 Oct. 11, 2018

(30) Foreign Application Priority Data

Apr. 10, 2017 (IN) .............................. 201741012763
Mar. 13, 2018 (IN) .............................. 201741012763

(51) Int. Cl.
*H04L 29/08* (2006.01)
*G06F 9/48* (2006.01)
(Continued)

(52) U.S. Cl.
CPC .............. *H04L 67/327* (2013.01); *G06F 9/48* (2013.01); *G06F 16/24575* (2019.01);
(Continued)

(58) Field of Classification Search
CPC .. G06Q 10/109; G06Q 10/1095; G06Q 10/10; G06Q 10/1093; G06Q 10/107; G06Q 10/02; G06Q 10/101; G06Q 10/04; G06Q 10/06312; G06Q 10/06314; G06Q 10/06315; G06Q 30/0251; G06Q 30/0271; G06Q 50/01; G06Q 10/063114; G06Q 20/32; G06Q 20/3227; G06Q 20/353;
(Continued)

(56) References Cited

U.S. PATENT DOCUMENTS

2002/0116459 A1  8/2002  Zuberec et al.
2008/0005053 A1  1/2008  Pulsipher
(Continued)

FOREIGN PATENT DOCUMENTS

CN      107295044 A  * 10/2017  ....... G06F 16/24578
KR  10-2010-0038930 A    4/2010

OTHER PUBLICATIONS

International Search Report dated Jul. 30, 2018, issued in International Application No. PCT/KR2018/004134.
(Continued)

*Primary Examiner* — Glenford J Madamba
*Assistant Examiner* — Abderrahmen Chouat
(74) *Attorney, Agent, or Firm* — Jefferson IP Law, LLP

(57) ABSTRACT

A method for processing a user request by an electronic device is provided. The method includes receiving the user request including natural language, analyzing the user request to detect a user intent and time information, determining one or more applications matching the user intent associated with the user request, determining a post event time period which is a time period before a time point extracted from the time information, and launching at least one among the one or more applications at the post event time period.

16 Claims, 14 Drawing Sheets

(51) Int. Cl.
*G06F 16/2457* (2019.01)
*G06F 40/279* (2020.01)

(52) U.S. Cl.
CPC .......... *G06F 40/279* (2020.01); *H04L 67/22* (2013.01); *H04L 67/306* (2013.01)

(58) Field of Classification Search
CPC .............. G06Q 20/363; G06Q 20/401; G06Q 20/4014; G06Q 30/02; G06Q 30/0246; G06Q 30/0267; G06Q 30/0255; G06Q 30/0269; G06Q 30/0273; G06Q 40/04; G06Q 50/00; G06Q 50/205; G06Q 50/22; G06Q 10/00; G06Q 10/06; G06Q 10/06316; G06Q 10/087; G06Q 10/20; G06Q 20/00; G06Q 20/0453; G06Q 20/10; G06Q 20/22; G06Q 20/322; G06Q 20/3821; G06Q 20/405; G06Q 30/0222; G06Q 30/0231; G06Q 30/0262; G06Q 30/0282; G06Q 30/0283; G06Q 30/04; G06Q 30/0601; G06Q 30/0631; G06Q 30/0643; G06Q 40/00; G06Q 40/06; G06Q 40/12; G06Q 40/123; G06Q 40/125; G06Q 50/10; G06Q 50/14; G06Q 50/30; G06F 3/0482; G06F 3/0488; G06F 16/9535; G06F 3/0481; G06F 3/016; G06F 3/04842; G06F 1/1684; G06F 3/0485; G06F 3/04883; G06F 3/04817; G06F 3/04847; G06F 3/167; G06F 2203/04806; G06F 3/048; G06F 16/285; G06F 9/542; G06F 17/245; G06F 1/325; G06F 3/04845; G06F 16/313; G06F 16/3344; G06F 17/27; G06F 17/28; G06F 16/335; G06F 16/951; G06F 3/013; G06F 16/2465; G06F 16/2474; G06F 16/353; G06F 16/48; G06F 17/243; G06F 17/2705; G06F 17/2765; G06F 21/50; G06F 21/60; G06F 21/6245; G06F 221/2101; G06F 2221/2111; G06F 9/451; G06F 16/435; G06F 19/00; G06F 2203/04808; G06F 3/0484; G06F 3/04886; G06F 9/445; G06F 9/466; G06F 11/3636; G06F 16/24578; G06F 16/44; G06F 16/487; G06F 16/86; G06F 16/9017; G06F 16/9024; G06F 16/9577; G06F 16/958; G06F 17/224; G06F 17/227; G06F 17/2785; G06F 17/30867; G06F 19/3481; G06F 1/1626; G06F 1/163; G06F 1/3203; G06F 1/329; G06F 2203/04104; G06F 3/017; G06F 3/0416; G06F 3/0483; G06F 9/45529; G06F 15/0266; G06F 16/00; G06F 16/245; G06F 16/252; G06F 16/287; G06F 16/3329; G06F 16/337; G06F 16/338; G06F 16/34; G06F 16/41; G06F 16/447; G06F 16/489; G06F 16/56; G06F 16/5866; G06F 16/639; G06F 16/683; G06F 16/955; G06F 16/9562; G06F 16/957; G06F 17/212; G06F 17/24; G06F 17/248; G06F 17/30716; G06F 17/30864; G06F 21/6227; G06F 2203/0381; G06F 3/02; G06F 3/0362; G06F 3/0486; G06F 8/34; G06F 8/65; G06F 9/44; G06F 9/4443; G06F 9/453; H04M 1/72566; H04M 1/72569; H04M 19/04; H04M 67/26; H04M 67/306

See application file for complete search history.

(56) References Cited

U.S. PATENT DOCUMENTS

| | | | |
|---|---|---|---|
| 2011/0289015 A1* | 11/2011 | Mei | G06Q 10/04 705/347 |
| 2013/0103450 A1* | 4/2013 | Lehmann | G06Q 10/06314 705/7.19 |
| 2014/0015776 A1 | 1/2014 | Kim et al. | |
| 2014/0015780 A1 | 1/2014 | Kim et al. | |
| 2014/0149218 A1* | 5/2014 | Bhogal | G06Q 30/0261 705/14.58 |
| 2015/0112962 A1* | 4/2015 | Simhon | G06N 7/005 707/709 |
| 2015/0168150 A1* | 6/2015 | Kahn | G01C 21/00 701/408 |
| 2015/0278370 A1 | 10/2015 | Stratvert et al. | |
| 2016/0189225 A1* | 6/2016 | Glover | G06F 16/9537 705/14.55 |
| 2016/0283972 A1 | 9/2016 | Bayliss-McCulloch | |
| 2016/0321052 A1* | 11/2016 | Sharifi | G06F 16/9535 |
| 2016/0352850 A1 | 12/2016 | Wu | |
| 2017/0098159 A1* | 4/2017 | Sharifi | G06F 3/0484 |
| 2019/0132406 A1* | 5/2019 | Cai | H04L 67/22 |

OTHER PUBLICATIONS

Move over Siri: Samsung's AI assistant Bixby may be used in all pre-installed apps on its upcoming Galaxy S8, URL: http://www.dailymail.co.uk/sciencetech/article-4070792/Move-Siri-Samsung-s-AI-assistant-Bixby-used-pre-installed-apps-upcoming-Galaxy-S8.html, Dec. 28, 2016.

European Search Report dated Jan. 13, 2020, issued in European Application No. 18783656.4-1213 /3545413 PCT/KR2018004134.

* cited by examiner

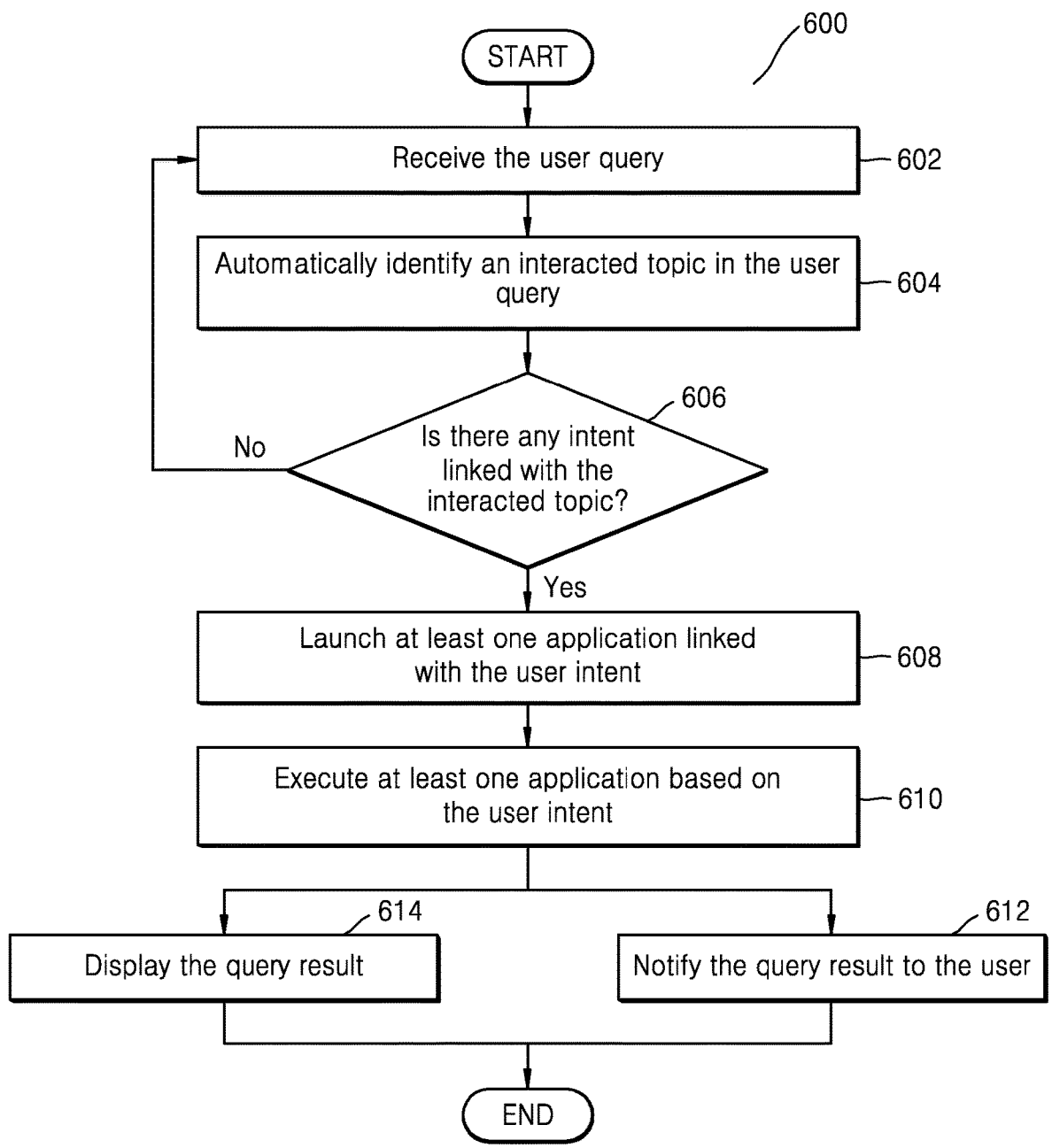

FIG. 10A
I want to buy a TV before move to new apartment
The input is made on Sep, 2018
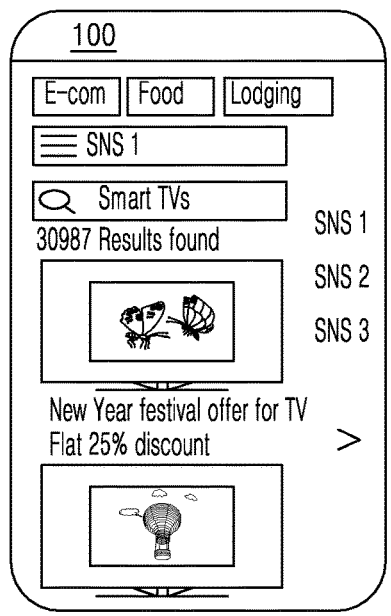
FIG. 10B
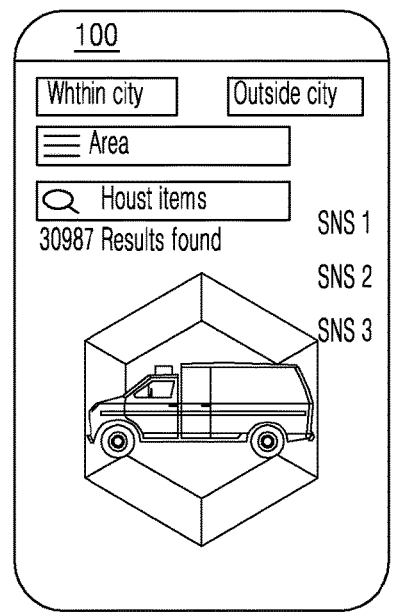
FIG. 10C
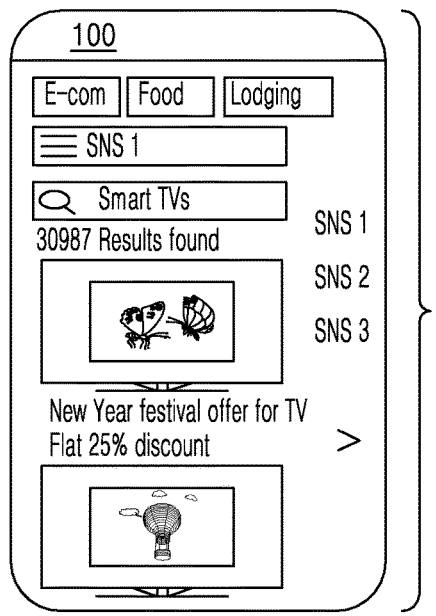
TOR is determined based on user searching for packing and moving service providers

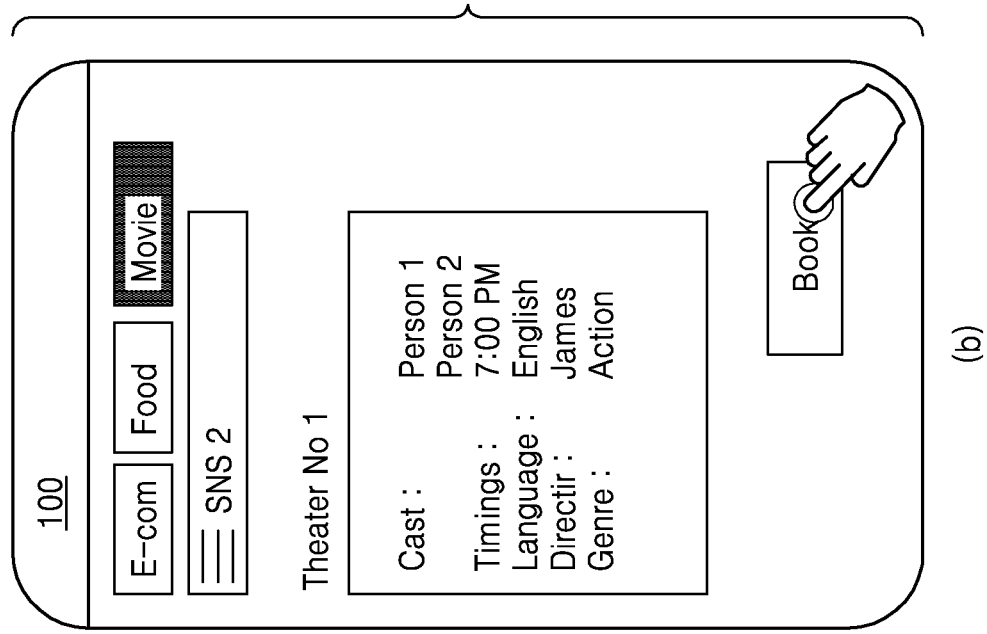
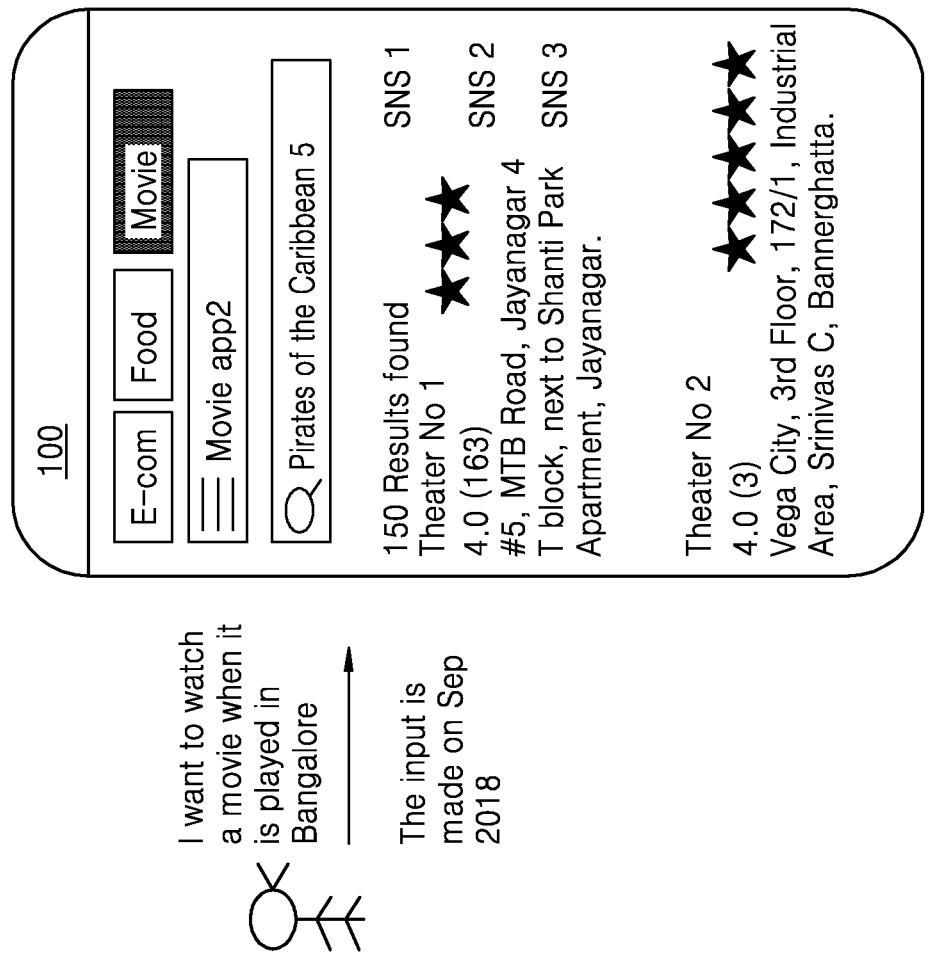

METHOD AND APPARATUS FOR PROCESSING USER REQUEST

CROSS-REFERENCE TO RELATED APPLICATION(S)

This application is based on and claims priority under 35 U.S.C. § 119(a) of an Indian patent application number 201741012763, filed on Apr. 10, 2017, in the Indian Patent Office, and of an Indian patent application number 201741012763, filed on Mar. 13, 2018, in the Indian Patent Office, the disclosure of each of which is incorporated by reference herein in its entirety.

BACKGROUND

1. Field

The disclosure relates to a user request processing system. More particularly, the disclosure relates to a method and electronic device for processing a request at a post event time period.

2. Description of Related Art

A natural language processing (NLP) which is once heard only in a research domain is now used in electronic devices. A Brain-Computer Interface is one of the technologies which is to be implemented on commercial products very soon. This means that by interfacing with the brain-activity (or thoughts), users are moving a step forward in terms of identifying an exact user intent rather than mere interests that are currently learned from discrete application based user interactions. The Brain Computer Interface would require new ways of managing user interfaces.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for processing a request at a post event time period.

In accordance with an aspect of the disclosure, a method for processing a user request is provided. The method includes receiving the user request including natural language, analyzing the user request to detect a user intent and time information extracted from the user request, determining one or more applications matching the user intent associated with the user request, determining a post event time period which is a time period before a time point extracted from the time information, launching at least one among the one or more applications at the post event time period.

In accordance with another aspect of the disclosure, an electronic device for processing a user request is provided. The electronic device includes a memory and a processor which coupled to the memory. The processor is configured to receive the user request including natural language, analyze the user request to detect a user intent and time information extracted from the user request, determine one or more contextually relevant applications matching the user intent associated with the user request, determine a post event time period which is a time period and is set before a time point determined based on the time information, and launch at least one among the one or more applications at the post event time period.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a flowchart of various operations for processing a user request at a post event time period in one or more applications according to an embodiment of the disclosure;

FIGS. 10A, 10B, and 10C illustrate example scenarios in which a user request is processed to display an offer for products, during various occasions based on topic information linked to the user request according to various embodiments of the disclosure;

FIGS. 13A and 13B illustrate example scenarios in which a user request is processed to display an offer for booking tickets during various occasions based on user priority according to various embodiments of the disclosure.

The same reference numerals are used to represent the same elements throughout the drawings.

DETAILED DESCRIPTION

Figure 1:
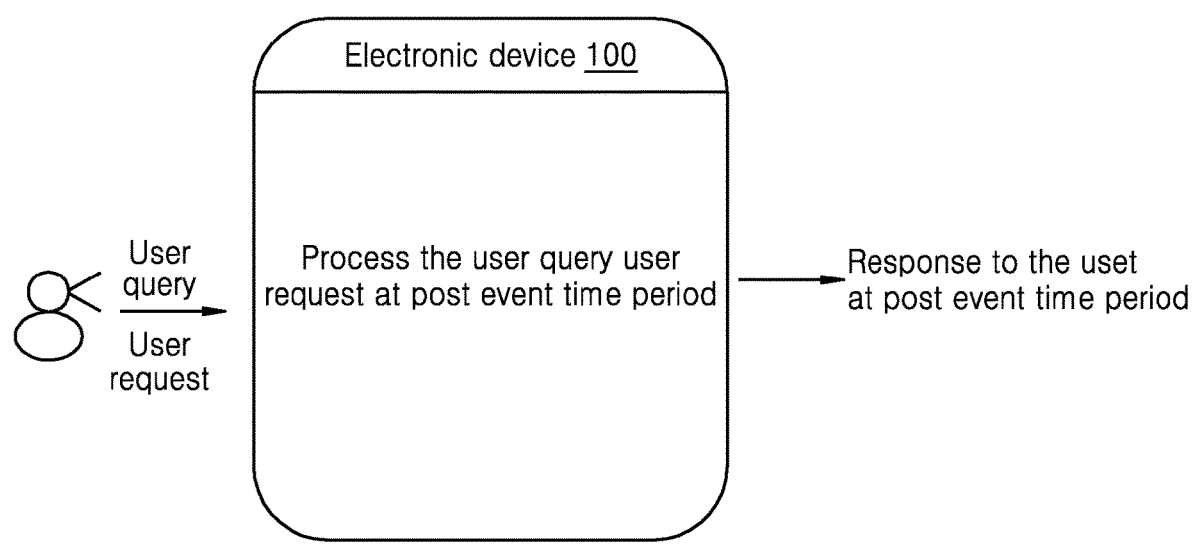
FIG. 1 illustrates an overview of an electronic device for processing a user request according to an embodiment of the disclosure.

The following description with reference to the accompanying drawings is provided to assist in a comprehensive understating of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The embodiments herein achieve an electronic device for processing a request. The electronic device includes a content processing engine coupled to a memory and a processor. The content processing engine is configured to receive the user request including natural language and to analyze the user request to determine a user intent and a post event time period for processing the user request. The post event time period indicates a time-of-response (TOR) for the user request. The content processing engine determines one or more contextually relevant applications corresponding to the user intent associated with the user request. The content processing engine automatically processes the user request with the one or more determined applications at the post event time period.

The proposed method can be used to provide a user intent awareness application framework, which executes a set of relevant applications within the scope of the user intent based on the exacted intended TOR to provide an intelligent user interface. This results in enhancing user experiences.

The proposed method can be used to automatically infer the intended TOR of the user-specific intent and execute the set of application/services within the scope of the query. This results in enhancing the user experience in an effective manner.

The method can be used to provide or display on an electronic device, the user response for the user query based on inferred TOR in an effective manner. The method can perform an automatic inference of the intended TOR of the user-specific intent.

Various methods provide text inputs, voice inputs and/or image inputs as a user's query input made to a particular electronic device and obtain the things done instantly. But there are situations where the user-specific intent without precisely expecting its response at that point in time. These scenarios are more and more realistic and relevant in a brain-computer interfaces and natural language processing (NLP) based interfaces which are going to revolutionize human machine interactions in the future. For example, the following query provided by the user:

1. I prefer an Italian restaurant on my next Anniversary,
2. I want to buy a television (TV) by next March before moving into my new apartment,
3. I plan a trip to New York next year, and want to watch a movie, "Pirates of the Caribbean 5" when it is played in Bangalore.

FIG. 1 illustrates an overview of an electronic device for processing a user request according to an embodiment of the disclosure.

Referring to FIG. 1, the electronic device 100 may process the user query or the user request at post event time period. The electronic device 100 can be, for example, a mobile phone, a smartphone, a laptop, a desktop computer, a personal digital assistant (PDA), a tablet, a smart watch, a smart band, a phablet, or any other electronic device.

In an embodiment, the electronic device 100 is configured to receive the user request which comprises text inputs, image inputs and/or image inputs and analyze the user request (the user's query) to detect user intent and time information for processing the user request. The time information extracted from the text inputs may be a post event time period which indicates a TOR for processing the user request. The electronic device 100 may determine one or more contextually relevant applications matching the user intent associated with the user request. The electronic device 100 may automatically process the user request with the one or more applications at the post event time period. The application can be, for example a chatting application, a booking application, a calendar application, a web application, a finance-related application, a shopping application, a social networking application, a reminder application, or the like.

Based on the post event time period, the electronic device 100 may provide one or more responses to the user based on the user intent.

In an embodiment, the TOR for the user request is dynamically determined based on at least one of an interaction pattern of a content of at least one application, a switching pattern from at least one application to other application in the electronic device 100, and/or a context of the at least one application executed in the electronic device 100, features supported by the at least one application, applications linked with the at least one application, and an external environment.

In an embodiment, the post time event is triggered to execute the user intention after receiving the user request (i.e., user query).

In an embodiment, the electronic device 100 may provide at least one response by monitoring an activity of the user and detecting a context of the activity.

In an embodiment, the electronic device 100 may provide at least one response by automatically detecting a topic related to the user intent at the post event time period, and linking the topic to the user intent.

For example, the electronic device 100 receives the user query input of "I want to buy a computer before going to college in September 2018" in a textual format, a voice format or a hybrid format with a textual format and an image format containing an image of a computer on January 2018. The electronic device 100 automatically detects the user intent by extracting "buy", "computer" and the time event of "before September 2018". In addition, the electronic device 100 automatically identifies a set of applications (e.g., an e-commerce application or the like) related to the user query or the detected user intent. The electronic device 100 may automatically launch a set of applications (e.g., an e-commerce application, a booking application or the like) and show web-based offers for the computer in response to the extracted terms of "buy" and "computer".

In another embodiment, based on an input by a user, the electronic device 100 searches accommodations such as a hotel or a hostel near the college, on a web browser, on May 2018. Based on the user query and the user-initiated search on the web browser, the electronic device 100 may automatically detect a pre-defined topic related to the identified context and time (e.g., searching a hotel or a hostel near the college on May 2018). While searching a hotel or a hostel near the college on May 2018, the electronic device 100 may automatically launch a set of applications (e.g., an accommodation application, a booking application or the like) and show the deals for buying the computer.

In an embodiment, the post event time period is determined based on at least one of the user interest, a user profile, and a user activity.

When the user is interacting with the electronic device 100, the electronic device 100 automatically identifies the interacted topic. Further, the electronic device 100 detects that the user searches the interacted topic linked with user interested information. The electronic device 100 may automatically launch and execute the application linked with the user intent related to the user interested information. In an embodiment, the electronic device 100 may display notifications to the user based on the interacted topic linked with the user intent related to the user interested information.

For example, the user provides the user query of "I want to watch the Avengers when it is played in New York." The electronic device 100 may determine an application for purchasing a movie ticket for the Avengers screening in New York. The application executed on the electronic device 100 may also detect the post event time period on which the movie ticket for the Avengers is first available in New York area. In this situation, the post event time period can be interpreted as a time point when the movie ticket (an item which is requested to be purchased by the user) becomes available first in a particular region which can be extracted in the user's request (for example "New York").

In an embodiment, the user profile includes at least one of location information, financial information, health-related information, social information, professional information, a behavior-metrics, and/or a knowledge-metric of the user.

In an embodiment, the post time event for processing the user request is dynamically determined based on a trend analysis.

In an embodiment, the post time event for processing the user request is determined in accordance with the at least one topic associated with the user intent.

In an embodiment, the post time event for processing the user request is determined based on an occurrence of an event.

In an embodiment, the post time event for processing the user request is determined based on an analyzed user profile.

In an embodiment, the user is now celebrating his/her birthday in an Arabian restaurant in New York. Now, the user provides to the electronic device 10 the user query of "I look for a Korean restaurant in New York for my next birthday." In response to the user query, the electronic device 100 automatically detects the user intent of Korean restaurant in New York, and the time event which is his/her next birthday. The electronic device 100 may automatically launch a set of applications (e.g., cuisine application for New Yorkers, gourmet/restaurant application or the like) and show most relevant (location, genre) Korean restaurant around next birthday of the user. The results are displayed based on the user's personal information. In an embodiment, the specific date (next birthday) can be extracted from any application installed in the user's electronic device, for example, calendar application or a chatting application, or any kind of social media application such as Facebook™, Instagram™ etc.

In an embodiment, the user query is processed in a cross-application environment. The cross application environment corresponds to an environment where there are multiple applications installed or running in the electronic device 100. In an embodiment, the electronic device 100 may identify the TOR from the user intent. Based on the TOR and the user intent, the electronic device 100 may launch and execute multiple applications matching the scope of the user query. Based on the TOR and the user intent, the electronic device 100 may provide the user response.

In an embodiment, when a user provides a request of "trip to Hong Kong on May 3, 2018", the TOR is detected to be May 3, 2018, and the user intent is a trip to Hong Kong. In response to the TOR of May 3, 2018 and the user intent of overseas traveling to Hong Kong, the electronic device 100 may launch, for instance, on May 1, 2018, an airport cap booking application, a Hong Kong guide application, and discounted tickets to Hong Kong application which sells discounted airplane tickets for Hong Kong. The date of May 1, 2018, is determined by the electronic device 100 by analyzing the user intent of the trip to Hong Kong which is located overseas and requires taking an airplane at the airport.

In an embodiment, the TOR component is derived from multiple sources as follows:
a) Pre-conditions based inference,
b) Directly from the intent,
c) The matching intent with the personal information, such as anniversary, birthday, and travel plan etc.
d) Matching intent with any external environments such as online trends, and weather etc.

In an embodiment, the electronic device 100 may be implemented to provide assistance in any number of different domains. The different domains can be, for example, but not limited to, local services (including location-specific and time-specific services such as restaurants, movies, meeting places or the like), e-commerce service (including online purchases of items such as books, computer or the like), travel services such as flights, hotels, attractions, or the like.

The electronic device 100 may be designed to include functionality for automating the use of data and services available over the Internet to discover, investigate, select among, reserve, and otherwise learn about things to do (including but not limited to movies, events, performances, exhibits, shows and attractions); places to go (including but not limited to travel destinations, hotels and other places to stay, landmarks and other sites of interest, etc.); places for eating or drinking (such as restaurants and bars), times and places for a meeting, and any other source of entertainment or social interaction which may be found over the Internet.

The electronic device 100 may include functionality for enabling the operation of applications and the services via a natural language dialog that may be otherwise provided by applications with graphical user interfaces including search engine (including location-based search); global positioning system (GPS) or navigation (maps and directions); database lookup (such as finding businesses or people by name or other conditions); weather forecasts, checking the price of products or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling home appliances or light emitting diode (LED) devices related to light and temperature, controlling home security devices, playing music or video in a home network, etc.).

Figure 2:
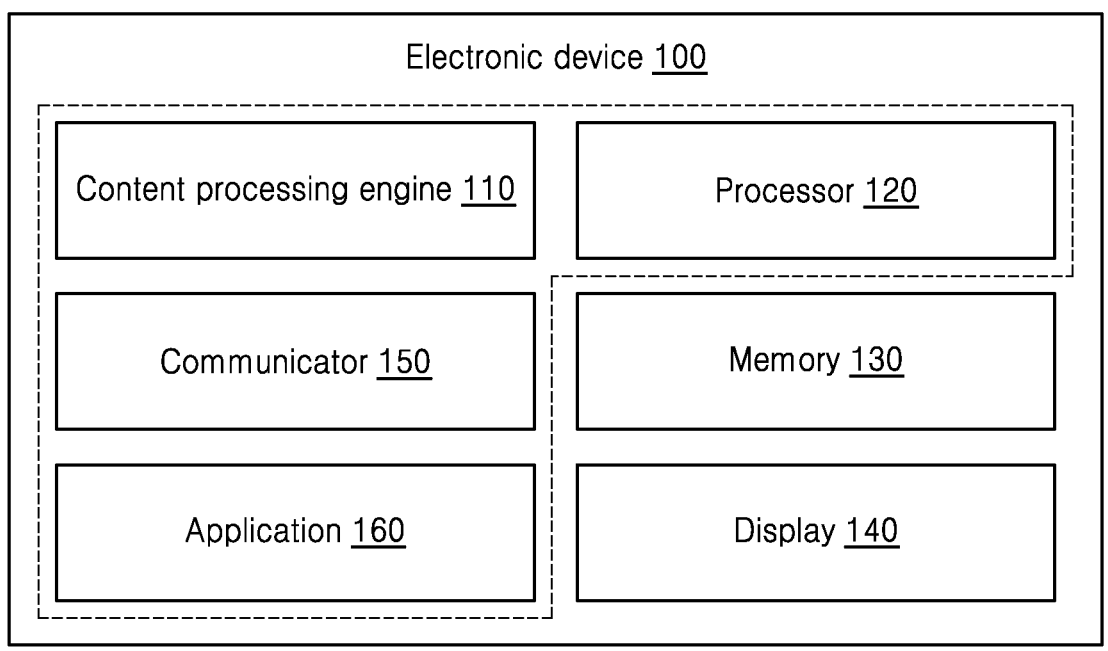
FIG. 2 is a block diagram illustrating various hardware components of an electronic device according to an embodiment of the disclosure.

FIG. 2 is a block diagram illustrating various hardware components of an electronic device according to an embodiment of the disclosure.

Referring to FIG. 2, the electronic device 100 includes a content processing engine 110, a processor 120, a memory 130, a display 140, a communicator 150, and an application 160. The content processing engine 110, the processor 120, the communicator 150 and the application 160 may be implemented as at least one hardware processor. In this case, the application 160 may be software programs installed in the memory 130.

The content processing engine 110 may receive the user request and analyze the user request to detect the user intent and the post event time period for taking actions in response to the user request. The content processing engine 110 may determine and/or identify one or more contextually relevant applications 160 matching the user intent derived from the user request. The content processing engine 110 may automatically launch and/or execute the one or more applications 160 related to the user intent at the post event time period.

Based on the post event time period, the content processing engine 110 may provide one or more responses to the user based on the user intent.

For example, the post event time period may indicate the TOR for the user request. The TOR for the user request is dynamically determined based on at least one of the interaction pattern of the content of at least one application 160, the switching pattern from at least one application 160 to other application in the electronic device 100, and a context of the at least one application 160 executed in the electronic device 100, features supported by the at least one application 160, applications linked with the at least one application 160, and an external environment.

The content processing engine 110 may provide at least one response by monitoring an activity of the user and the context of the activity.

The content processing engine 110 may provide at least one response by automatically detecting the topic associated with the user intent at the post event time period, and linking the topic to the user intent.

When the user is interacting with the electronic device 100, the electronic device 100 automatically identifies and determines the interacted topic by analyzing the interaction between the user and the electronic device. When the content processing engine 110 determines or detects that the user searches for the interacted topic linked with user-interested information, the content processing engine 110 may automatically launch the application 160 linked with the user intent related to the user interested information and may process the intended user query in the application 160. In the meantime, the display 140 displays notifications to the user based on the interacted topic linked with the user-interested information.

The content processing engine 110 may identify the TOR from the user intent. Based on the TOR and the user intent, the content processing engine 110 may launch or execute a set of applications 160 matching the scope of the user query. Based on the TOR and the user intent, the content processing engine 110 provides the user response.

The content processing engine 110 is capable of communicating with the processor 120, the memory 130, the display 140, the communicator 150, and the application 160. As used herein, the processor 120 is not limited merely to those integrated circuits referred to in the art as a processor, but may also refer to a microcontroller, a microcomputer, a programmable logic controller, an application-specific integrated circuit, and any other programmable circuit. In addition, the content processing engine 110 is implemented as a hardware processor, and may be separate from, or a part of, the processor 120.

The communicator 150 may communicate internally between hardware components in the electronic device 100. The processor 120 is coupled to the memory 130 for processing various instructions stored in the memory 130 to process the user request.

The memory 130 can store the usage history, the scrolling pattern of the content, context of the application 160, and the interaction pattern of the content. The memory 130 may include non-volatile storage elements. Examples of such non-volatile storage elements may include magnetic hard discs, optical discs, floppy discs, flash memories, or forms of electrically programmable read only memories (EPROMs) or electrically erasable and programmable read only memories (EEPROMs). In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 108 is non-movable. In some examples, the memory 130 can be configured to store larger amounts of information than the memory. In certain examples, a non-transitory storage medium may store data that can, over time, change (e.g., in random access memory (RAM) or cache).

Further, regardless of a configuration of the electronic device 100, the electronic device 100 may employ memory 130 configured to store data, program instructions for general-purpose network operations and/or other information relating to a function for processing the user query at the post event time period. The program instructions may control the operation of an operating system and/or one or more applications 160.

The electronic device 100 may call external services when needed to obtain additional information or refer to store data concerning previous interactions with external services and interactions. The external services include web-enabled services and/or functionality related to or installed on the hardware device itself.

For example, the user may provide inputs for assistance such as "I need to wake at 5 a.m. to book a flight ticket for New Year celebration." Once the electronic device 100 determines the user's intent of waking up early at 5 a.m., the electronic device 100 may call external services to interface with an alarm clock function or application on the electronic device 100. The electronic device 100 sets the alarm on behalf of the user. In this manner, the user can use the assistance function according to the proposed method unlike mechanisms of the related art for setting the alarm manually or performing other functions on the device.

The display 140 can display the content of the application 160. The display 140 can be a touch screen display for providing various contents (e.g., visual cue, a visual indicator, visual icon etc.) on the electronic device 100. The display 140 can be implemented to have a multi-window display, a curved display, an edge-based display, or the like. The display 140 can be, for example, a liquid crystal display (LCD), an active matrix-organic LED (AM-OLED) display, a LED display, or the like.

Although FIG. 2 shows various hardware components of the electronic device 100, it is to be understood that other embodiments are not limited thereon. In other embodiments, the electronic device 100 may include less or more components. Further, the labels or names of the components are used only for illustrative purpose and does not limit the scope of the disclosure. One or more components can be combined together to perform a same or substantially similar function to process the user request.

Figure 3:
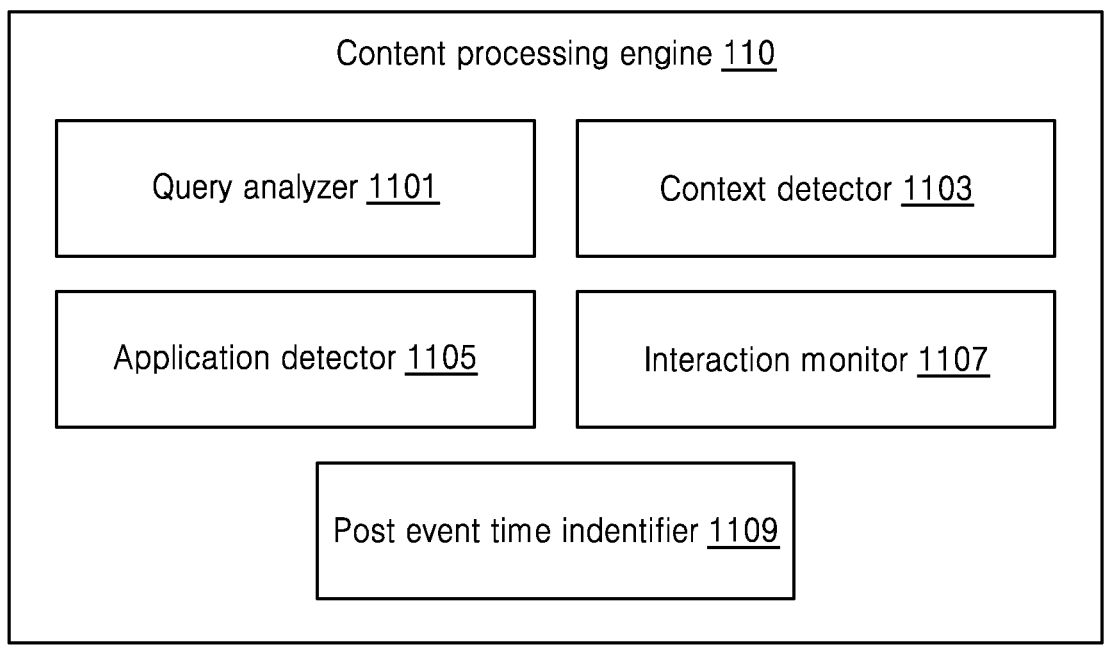
FIG. 3 is a block diagram illustrating various hardware components of a content processing engine of an electronic device according to an embodiment of the disclosure.

FIG. 3 is a block diagram illustrating various hardware components of a content processing engine of an electronic device according to an embodiment of the disclosure.

Referring to FIG. 3, the content processing engine 110 includes a query analyzer 1101, a context detector 1103, application detector 1105, interaction monitor 1107, and a post event time identifier 1109.

The query analyzer 1101 may receive the user request and analyze the user request to detect the user intent and the post event time period for processing the user request. The context detector 1103 and the application detector 1105 may determine one or more contextually relevant applications 160 matching the user intent associated with the user request. The query analyzer 1101 may automatically process the user request with the one or more determined applications 160 at the post event time period.

Based on the post event time period, the post event time identifier 1109 may provide one or more responses to the user request based on the user intent. The post event time identifier 1109 may provide at least one response by monitoring an activity of the user and the context of the activity.

The post event time identifier 1109 and the interaction monitor 1107 may provide at least one response by automatically detecting the topic associated with the user intent at the post event time period, and linking the topic to the user intent.

In case that the user is interacting with the electronic device 100, the interaction monitor 1107 automatically identifies the interacted topic. The interaction monitor 1107 determines that the user searches for the interacted topic linked with user-interested information, and then the post event time identifier 1109 automatically launches at least one application linked with the user intent extracted from the user interested information and processes the intent query by executing the at least one application. In the meantime, the display 140 displays notifications to the user based on the interacted topic linked with the user-interested information.

The post event time identifier 1109 may determine or identify the TOR from the user intent. Based on the TOR and the user intent, the post event time identifier 1109 may execute a set of applications matching the scope of the user query made during the user interaction. Based on the TOR and the user intent, the post event time identifier 1109 may provide the user response on the display.

The context detector 1103 supports a direct intent analysis for identifying the TOR. The interaction monitor 1107 captures user's personal information over a certain period of time and uses the user's personal information to derive the TOR.

The context detector 1103 comprehends user's intent to provide instant feedback. Finally, the context detector 1103 generates at least one response based on identified TOR.

Although FIG. 3 shows various hardware components of the content processing engine 110, it is to be understood that other embodiments are not limited thereon. In other embodiments, the content processing engine 110 may include less or more components. Further, the labels or names of the components are used only for illustrative purpose and does not limit the scope of the disclosure. One or more components can be combined together to perform a same or substantially similar function to process the user request. In addition, the query analyzer 1101, the content detector 1103, the application detector 1105, the interaction monitor 1107, and the post event time identifier 1109 may be implemented as at least one hardware processor.

Figure 4:
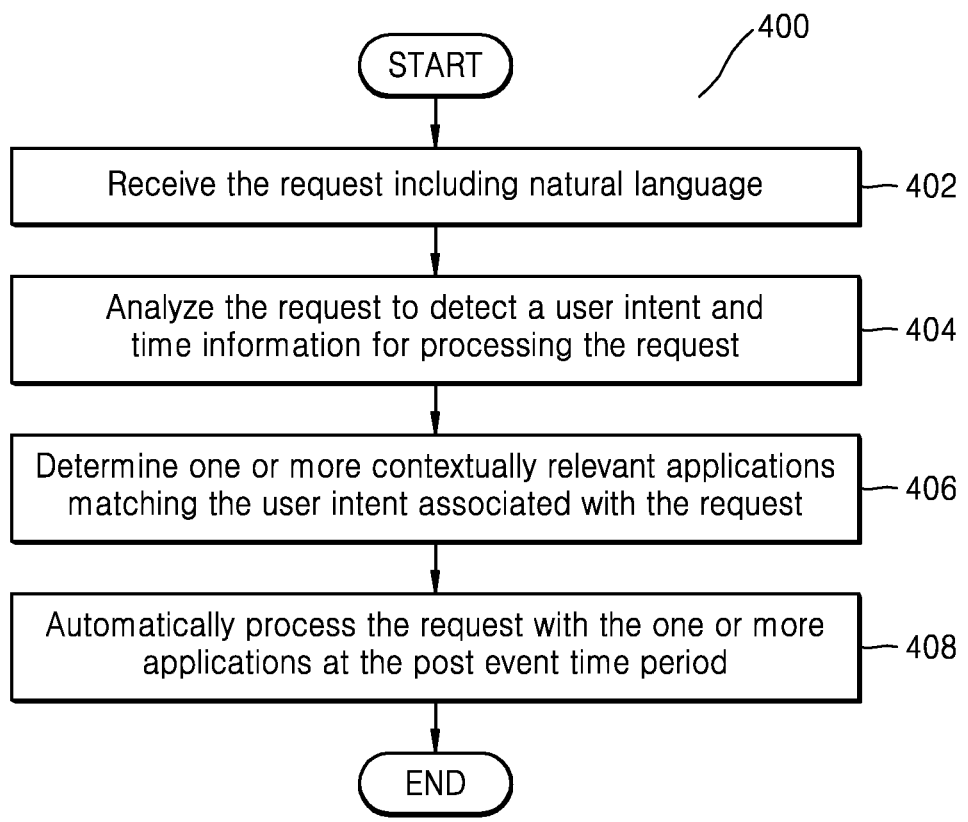
FIG. 4 illustrates a flowchart of various operations for processing a request at a post event time period according to an embodiment of the disclosure.

FIG. 4 is a flowchart of various operations for processing a request at a post event time period according to an embodiment of the disclosure.

Referring to FIG. 4, in operation 402, an electronic device receives at least one user request including the natural language.

In operation 404, the electronic device analyzes the at least one user request to detect the user intent and the time information which can be extracted from the user request. A post event time period for processing the user request can also be extracted from the time information. For instance, in case the user request is "I plan to travel Hong Kong from May 1, 2018", the post event time period can be a time frame between Apr. 20, 2018, and May 1, 2018, so that the user may prepare the trip to Hong Kong through applications executable in the user's electronic device. In particular, the time information may include May 1, 2018, which can be extracted from the user's request and the post even time period may be a certain period of time ahead of May 1, 2018, determined based on the user's request.

In operation 406, the electronic device determines or identifies one or more contextually relevant applications matching the user intent associated with the user request.

In operation 408, the electronic device automatically launches and executes the one or more applications at the post event time period for processing the user request.

The various actions, acts, blocks, operations, or the like in the flowchart may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
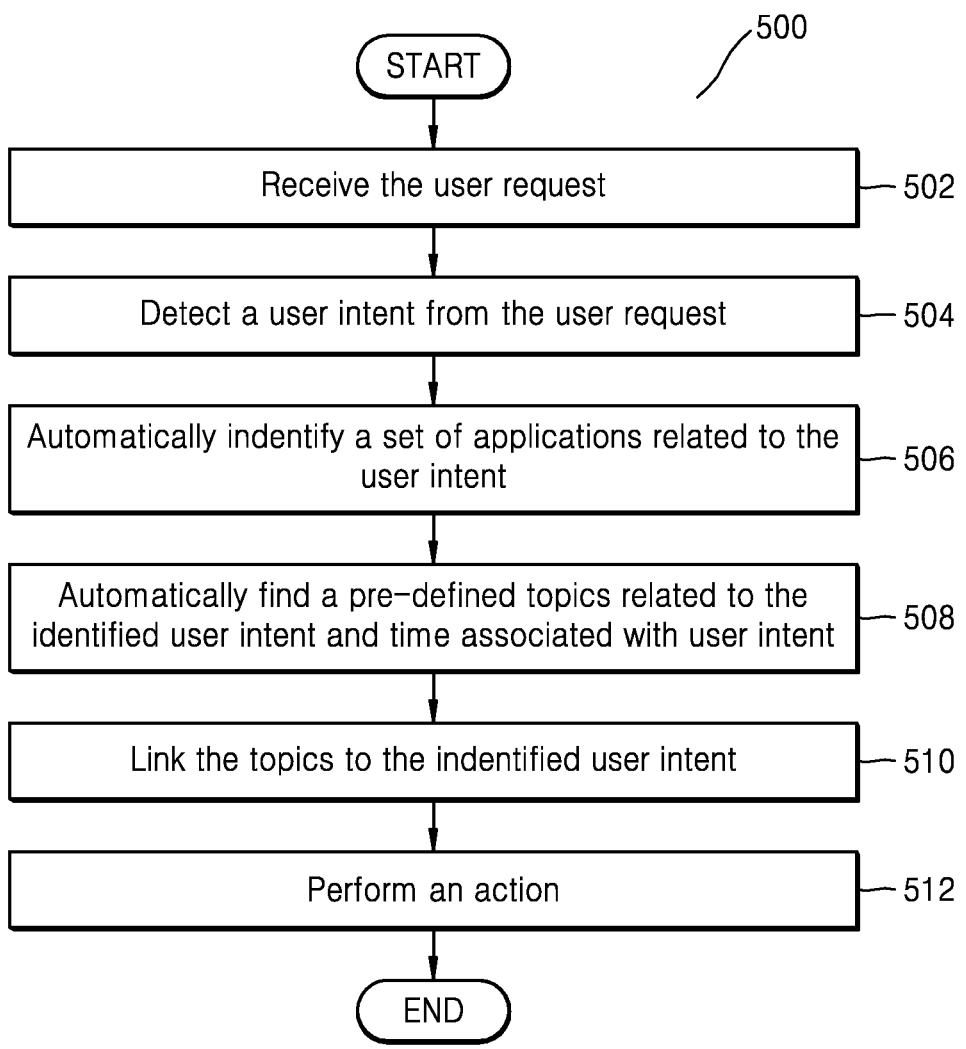
FIG. 5 illustrates a flowchart of various operations for processing a user request at a post event time period according to an embodiment of the disclosure.

FIG. 5 is a flowchart of various operations for processing a user request at a post event time period according to an embodiment of the disclosure.

Referring to FIG. 5, in operation 502, an electronic device receives a user request and in operation 504, the electronic device detects the user intent extracted from the user request.

In operation 506, the electronic device may automatically identify a set of application(s) related to the user intent and may automatically find pre-defined topics related to the identified intent and time associated with user intent in operation 508.

In operation 510, the electronic device may link the topic to the identified user intent and in operation 512, may perform an operation corresponding to the user intent.

The various actions, acts, blocks, operations, or the like in the flowchart may be performed in the order presented, in a different order or simultaneously. Further, in some embodiments, some of the actions, acts, blocks, operations, or the like may be omitted, added, modified, skipped, or the like without departing from the scope of the disclosure.

FIG. 6 is a flowchart of various operations for processing a user request at a post event time period in one or more application according to an embodiment of the disclosure.

Referring to FIG. 6, in operation 602, an electronic device receives at least one user query. In operation 604, the electronic device may automatically identify the interacted topic in the user query.

In operation 606, the electronic device determines any intent linked with the interacted topic. And in operation 608, the electronic device may automatically launch at least one application linked with the user intent.

In operation 610, the electronic device executes the at least one application 160 based on the user intent.

In operation 612, the electronic device notifies the query result to the user and in operation 614, the electronic device displays the query result. Although the operations of 612 and 614 are depicted alternatively, each of the operations 612 and 614 may be performed sequentially.

The various actions, acts, blocks, operations, or the like in the flowchart may be performed in the order presented, in a different order or simultaneously. Further, in some embodiments, some of the actions, acts, blocks, operations, or the like may be omitted, added, modified, skipped, or the like without departing from the scope of the disclosure.

Figure 7A:
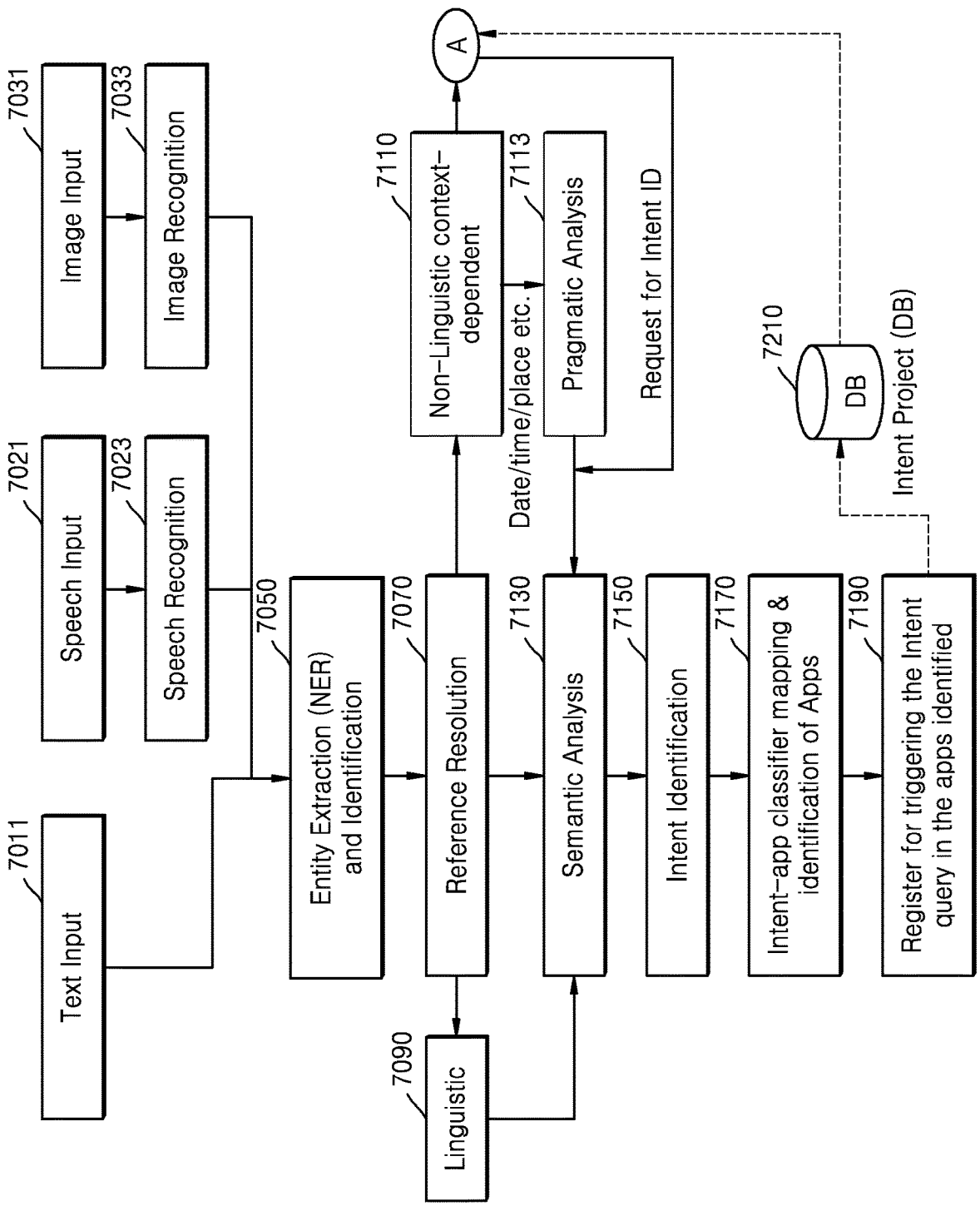
FIGS. 7A and 7B illustrate various operations for processing a user request at a post event time period in one or more applications according to various embodiments of the disclosure.
Figure 7B:
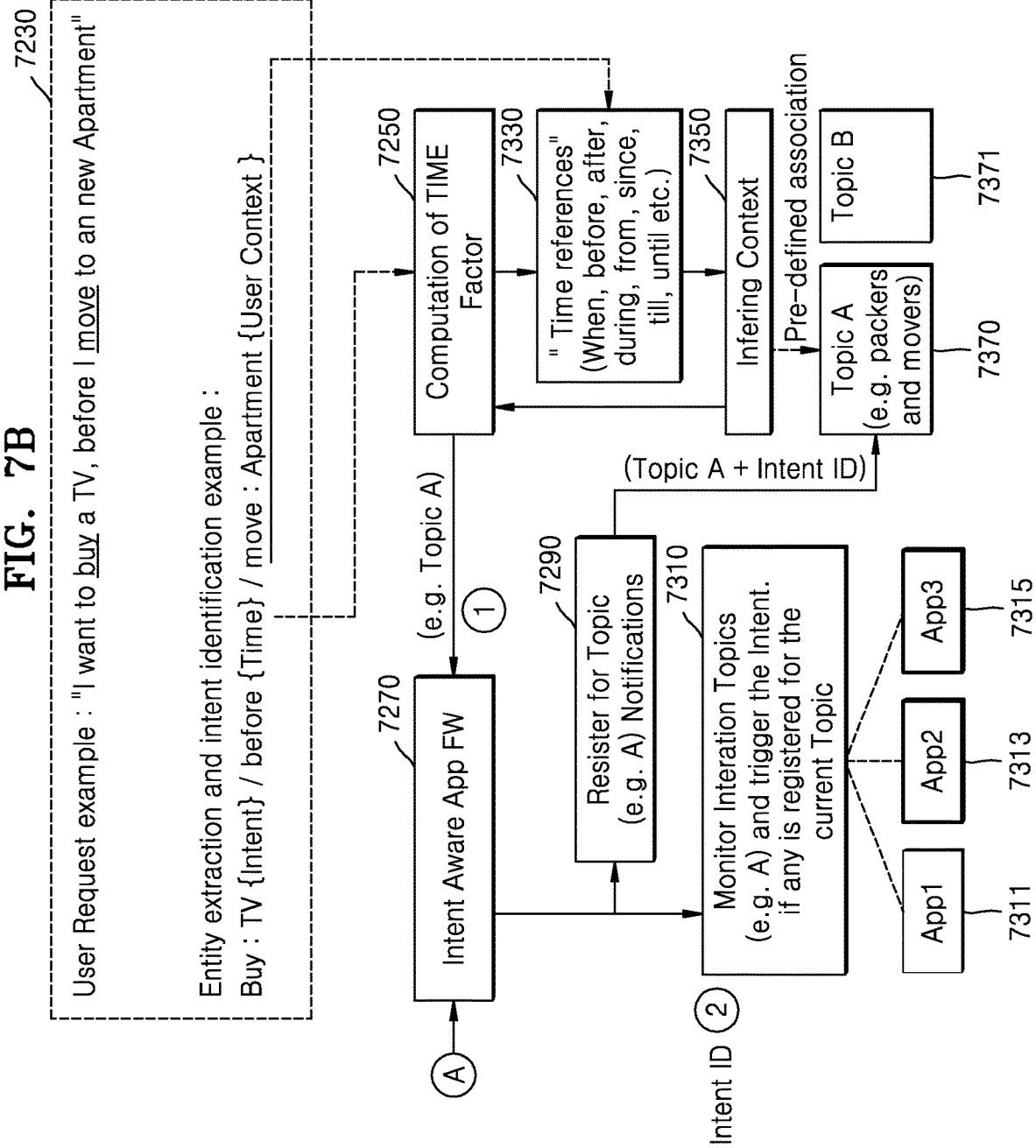

FIGS. 7A and 7B illustrate various operations for processing a user request at a post event time period in one or more application according to various embodiments of the disclosure.

Referring to FIGS. 7A and 7B, as illustrated by reference numerals 7011-7371, the query analyzer 1101 receives at least one user request in the form of text input and/or speech input. Based on the at least one user request, the context detector 1103 may perform an entity extraction and identification process. The context detector 1103 may obtain a reference resolution and a semantic analysis based on a linguistic model and a non-linguistic context-dependent model. The context detector 1103 may identify the user intent based on the obtained reference resolution and/or semantic analysis. The application detector 1105 may perform mapping an intent-application classifier information with the application. The post event time identifier 1109 may execute based on the user query (the user request) on the mapped application 160 at the post event time period. The application can be determined by monitoring the interaction topics inputted by the user in the electronic device 100.

The post time event time period may be extracted in the following manner. When the user makes a text input of "I want to buy a TV before moving to a new apartment", the electronic device may search, for example, a calendar application on which the moving date is input by the user. If the electronic device determines that the moving date is May 15, 2018, then the time information is set to include May 15, 2018, and the post event time period may be set timeline before the date of May 15, 2018. The time information may be determined based on searching the text input made by the user and a determination that any time-related information such as date, month (January, February, March, etc.), year or any kind of time-related word—birthday, anniversary, meeting, etc.

In an embodiment, if the user makes an image input of "TV" and a text input of "I want to buy (image)", the electronic device automatically searches networks to detect the model and/or the manufacturer of the TV based on image processing technology.

Figure 8A:
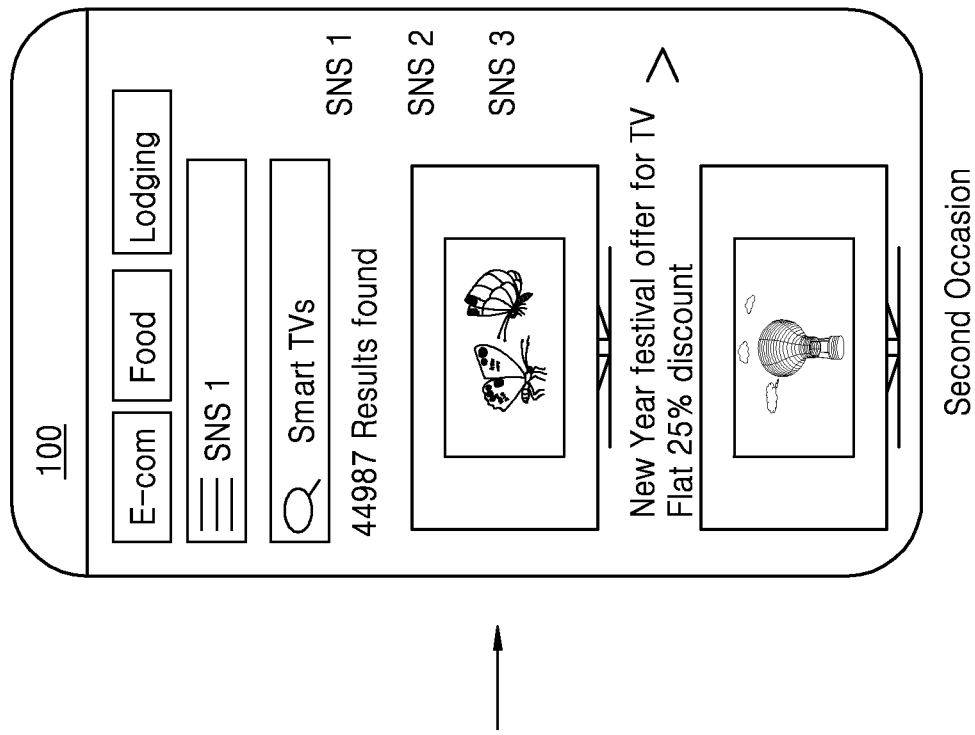
FIGS. 8A and 8B illustrate example scenarios in which a user request is processed to display an offer for products during various occasions according to various embodiments of the disclosure.
Figure 8B:
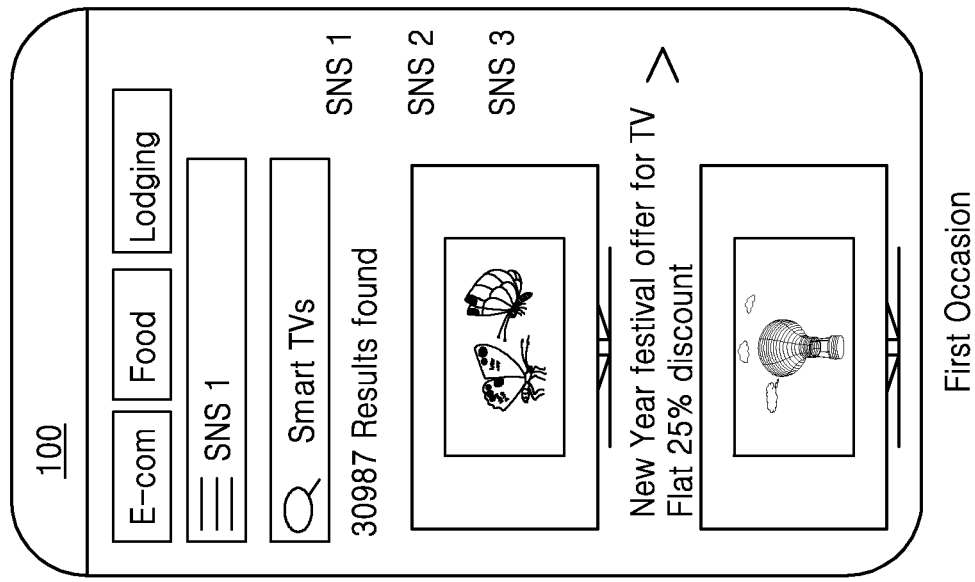

FIGS. 8A and 8B illustrate example scenarios in which a user request is processed to display an offer for a TV during various occasions around a post event time period according to various embodiments of the disclosure.

Referring to FIGS. 8A and 8B, the user provides a user query of "I want to buy a TV on February 2020" on September 2018. An electronic device 100 automatically determines the user's intent of "buy", "TV", the time event which is "February 2020". The electronic device 100 automatically identifies a set of applications (e.g., e-commerce application or the like) related to the user query. In addition, the electronic device 100 automatically determines pre-defined (learned) topics related to the identified context and time (e.g., any TV-related offer on a specified time such as New Year's festival). Based on the topic and user query, the electronic device 100 links the topics to the identified user intent. Further, the electronic device 100 executes the set of applications and displays sale offers for the TV during multiple occasions close to February 2020 as shown in FIGS. 8A and 8B.

Figure 9:
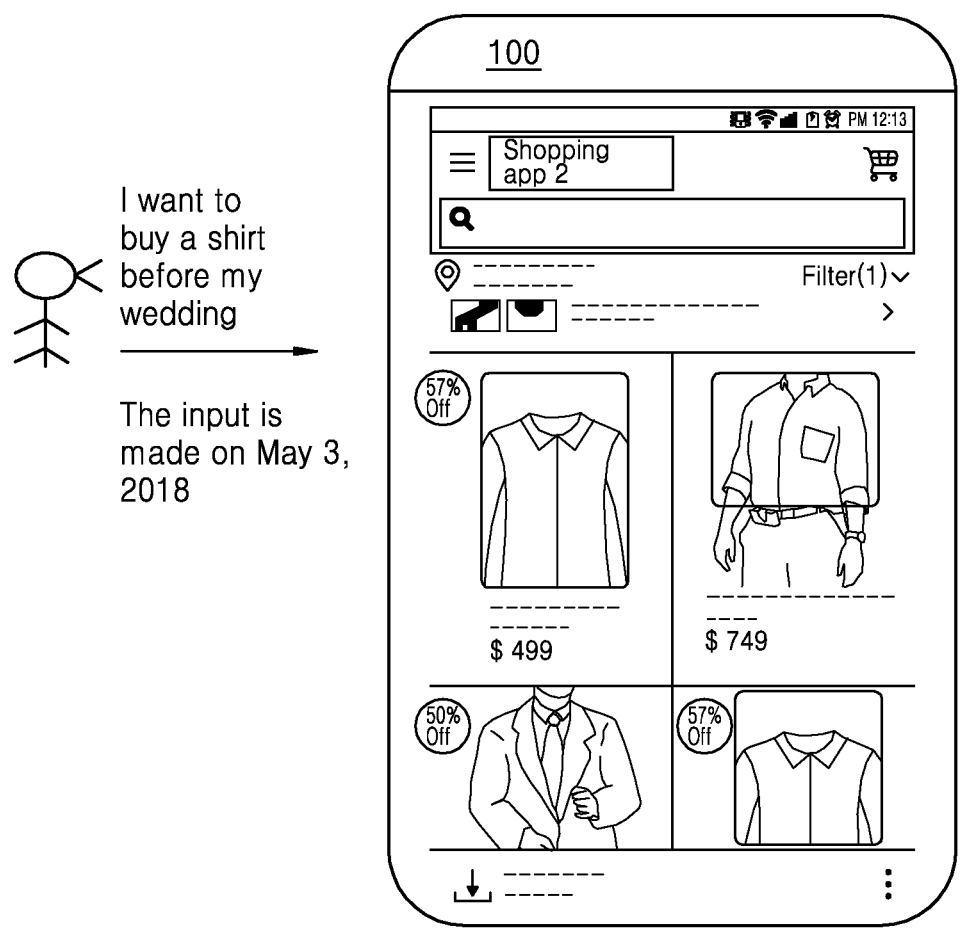
FIG. 9 illustrates an example scenario in which a user request is processed to display an offer for products during various occasions according to an embodiment of the disclosure.

FIG. 9 illustrates an example scenario in which a user request is processed to display an offer for products such as shirts during various occasions near the post event time period according to an embodiment of the disclosure.

Referring to FIG. 9, the user inputs the user query of "I want to buy a shirt before my wedding" on May 3, 2018. The electronic device 100 may automatically detect the user intent as "buy", "shirt", "my wedding" which is recognized as a timed event. Further, the electronic device 100 may automatically identify a set of applications (e.g., e-commerce application or the like) related to the user query. In addition, the electronic device 100 may automatically determine the pre-defined topics related to the identified context and time (e.g., any shirt related offer during the bargain sale festival before my wedding). Based on the topics and user query, the electronic device 100 may link the topics to the identified user intent. Further, the electronic device 100 executes the set of applications and displays the sale offer deals for the shirts during multiple occasions close to the user's wedding as shown in FIG. 9.

FIGS. 10A, 10B, and 10C illustrate example scenarios in which a user request is processed to display sale offers for the TV, during various occasions close to a post event time period such as new year festival, based on the topic linked to the user request according to various embodiments of the disclosure.

Referring to FIGS. 10A, 10B, and 10C, the user provides an input of the user query as "I want to buy a TV before move to the new Apartment". In response to the user query, the electronic device 100 automatically detect the user intent as "buy", "TV", the time event of "before move to the new Apartment" (e.g. Before {time}/Shift: Apartment {context}). Following to the detection of the user intent, the electronic device 100 may automatically identify a set of application (e.g., online shopping application) related to the user query. Then, the electronic device 100 may automatically determine pre-defined (learned) topics related to the identified context and time by monitoring the user activity (e.g., the user searches for the packing and moving service providers, interior design providers or the like). The pre-defined (learned) topics related to "searching for packing and moving service providers and home interior design providers". Based on the topics and the user query, the electronic device 100 links the topics to the identified user intent, e.g. "buy", and "TV". Further, the electronic device 100 executes the set of applications and displays the sale offers for the TV during multiple occasions before moving to the new Apartment as shown in the FIG. 10.

Figure 11:
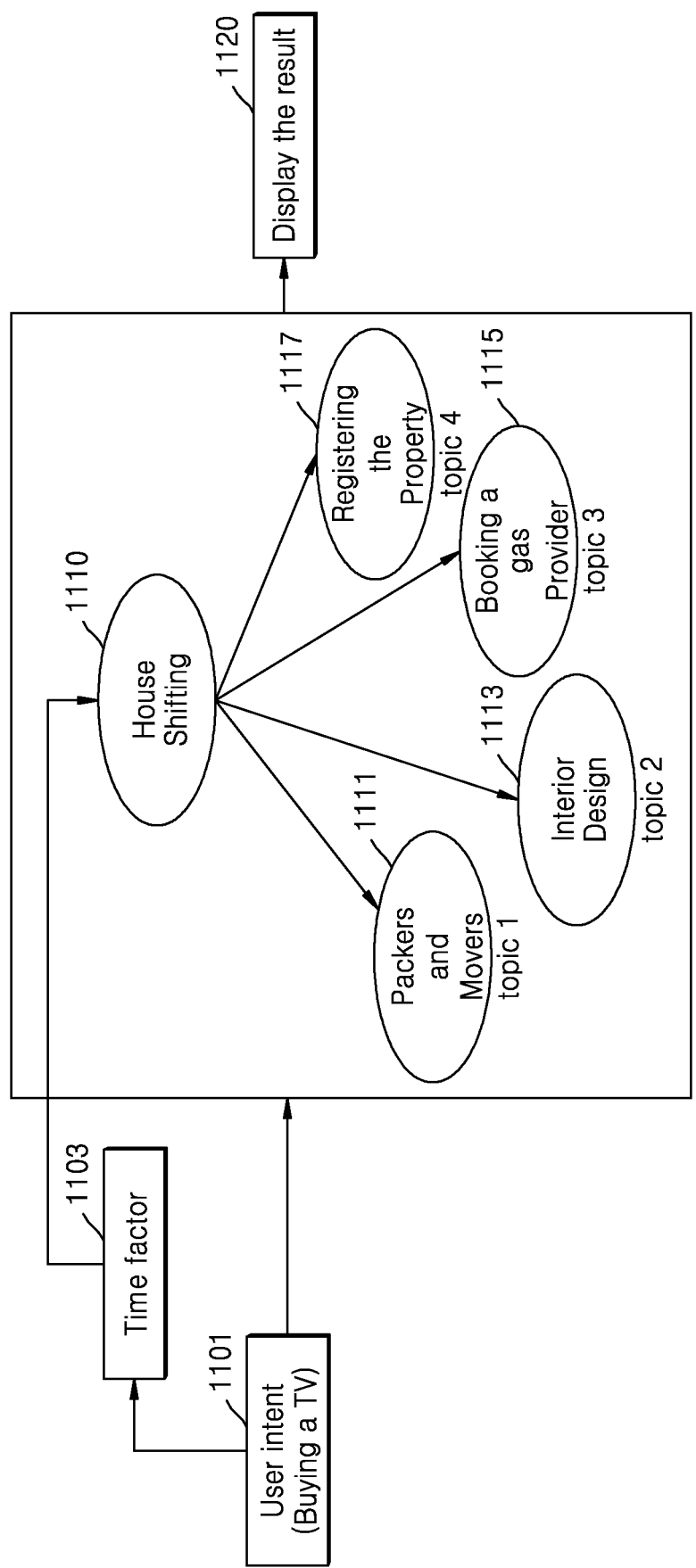
FIG. 11 illustrates an example scenario in which a topic linked to a user request is processed to display an offer for various service providers according to an embodiment of the disclosure.

FIG. 11 illustrates an example scenario in which a topic linked to a user request is processed to display service and/or product providers for TV and moving service according to an embodiment of the disclosure.

Referring to FIG. 11 and in connection with FIGS. 10A, 10B, and 10C, the user provides the user query of "I want to buy a TV before move to the new Apartment" in February 2018. Following a receipt of the user query, the electronic device 100 may automatically determine the user intent 1101 as "buy", "TV", the time event 1103 which is "before move to the new Apartment". The electronic device 100 may automatically identify a set of applications (e.g., e-commerce application or the like) related to the user query based on the topic. The topic is dynamically determined based on the user search on the web browser (e.g., the user may search for the packing and moving service providers for transporting the home appliance on the web browser, the user may search for the home interior design service providers on the web browser, the user may book the gas provider for the apartment, the user may register the property or the like).

Based on the topics and the user query, the electronic device 100 links the topics, such as the topics 1110, 1111, 1113, 1115, and 1117 to the identified user intent. Further, the electronic device 100 executes the set of applications to show the sale offers for the TV during multiple occasions before moving to the new Apartment.

Figure 12A:
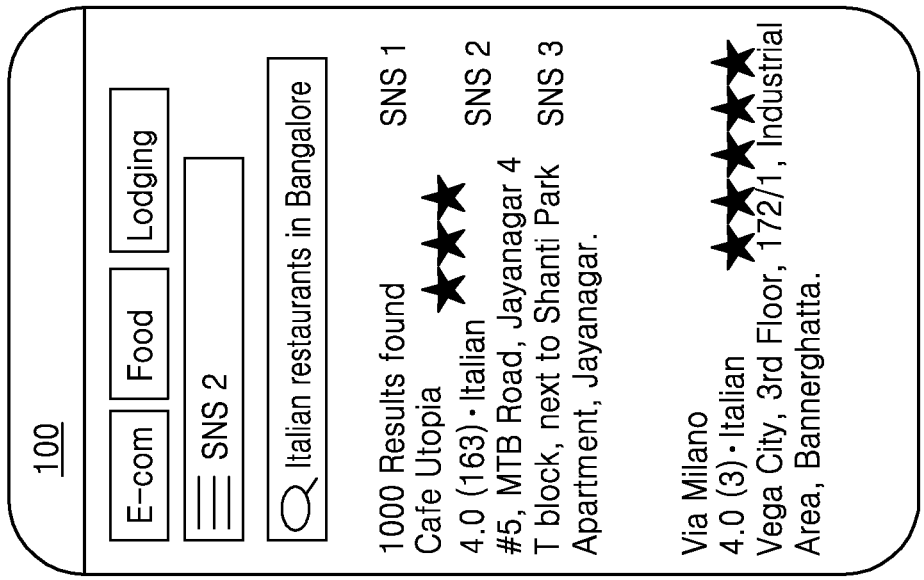
FIGS. 12A and 12B illustrate example scenarios in which the request is processed to display an offer for a restaurant during various occasions based on personal information according to various embodiments of the disclosure.
Figure 12B:
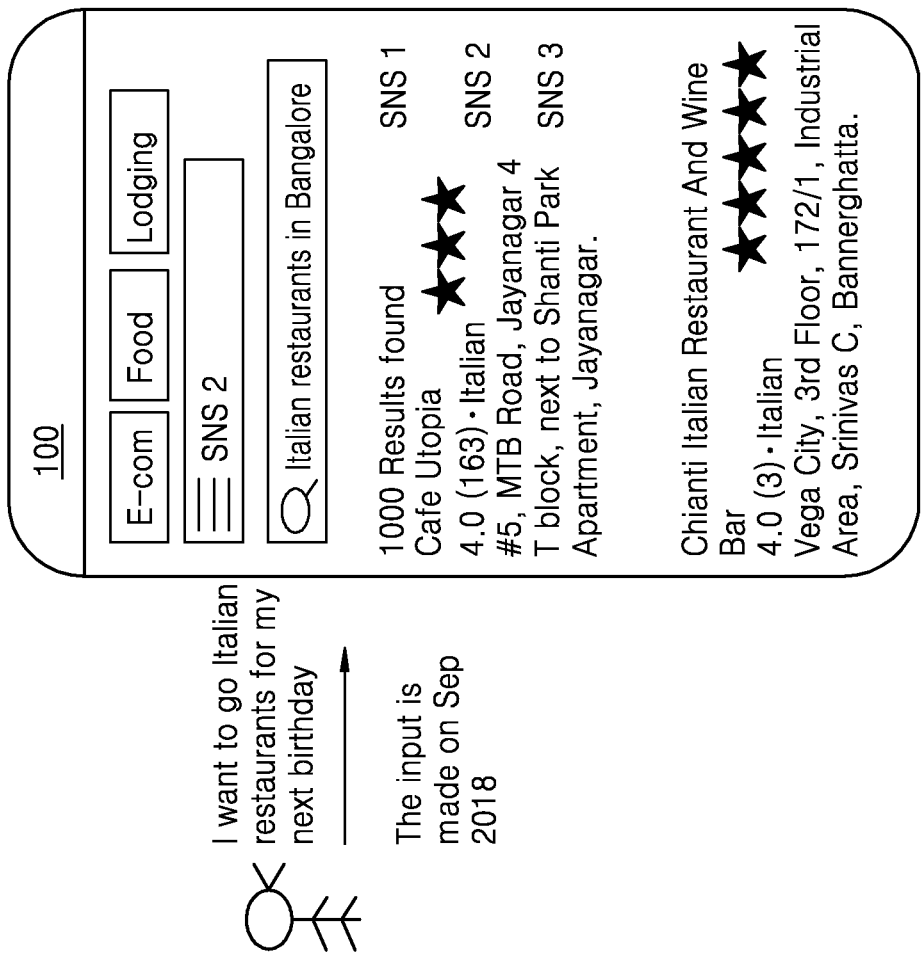

FIGS. 12A and 12B illustrate example scenarios in which the user request is processed to display the restaurants on various occasions nearby the post event time period based on the user's personal information according to various embodiments of the disclosure.

Referring to FIGS. 12A and 12B, the user is now celebrating his/her anniversary day in a Mexican restaurant in Bangalore, India. Thus, the user provides the user query of "I want to go Italian restaurants for my next birthday" as shown in FIGS. 12A and 12B. The electronic device 100 may automatically detect the user intent as "Italian restaurant", and the time event which is my next birthday. The electronic device 100 automatically launches and executes a set of applications (e.g., food-related application or the like) and shows nearby Italian restaurant around the user on his/her next birthday. The results are displayed based on the user's personal information. In other words, the electronic device 100 may search the database of the electronic device for the user profile including the user's birthday.

FIGS. 13A and 13B illustrate example scenarios in which a user request is processed to display an offer for booking a movie ticket for various occasions nearby the post event time period based on the user priority according to various embodiments of the disclosure.

Referring to FIGS. 13A and 13B, the user provides the user query of "I want to watch a movie (the Pirates of the Caribbean 5) when it is played in Bangalore." In this embodiment, the response corresponding to the user intent is provided to the user, when a "FIRST_BOOKING_EVENT" is triggered by the associated Movie booking service for the user intended movie to be screening in Bangalore. The application should have already registered for this particular event notification based on the user intent identified prior to a receipt of the event. The electronic device 100 determines the application booking EVENT in Bangalore for the same Movie on booking the first ticket to find the TOR. The electronic device 100 executes a movie booking application and prompts a notification to the user about the Movie to be launched in the Bangalore.

The embodiments disclosed herein can be implemented through at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing a user request in an electronic device, the method comprising:
   detecting one or more topics, using the electronic device, wherein each of the one or more topics is related to a time and a context;
   receiving the user request;
   analyzing the user request to detect a user intent and time information;
   identifying a topic associated with the user intent among the one or more topics based on a context of the topic;
   determining one or more applications matching at least one of the user intent or the identified topic associated with the user intent;
   determining, based on the identified topic and matching between the user intent and a weather forecast, a post event time period as a time before a time point corresponding to the time information, wherein the post event time period is determined in accordance with a time of the identified topic; and
   launching at least one among the one or more applications at the post event time period,
   wherein the launching of the at least one among the one or more applications comprises launching the at least one among the one or more applications during multiple occasions prior to the time point corresponding to the time information and close to the time point corresponding to the time information.

2. The method of claim 1, further comprising displaying a response matching the user intent during a period from the post event time period to the time point corresponding to the time information.

3. The method of claim 1, wherein the determining of the post event time period is performed based on the time of the identified topic that is learned from at least one of a user interest, a user profile, or a user activity.

4. The method of claim 3, wherein the user profile comprises at least one of location information, financial information, health related information, social information, professional information, a behavior-metrics, or a knowledge-metric.

5. The method of claim 1, wherein the post event time period for processing the user request is dynamically determined based on the time of the identified topic that is learned by a trend analysis.

6. The method of claim 1, wherein the user request comprises at least one of a text input, a voice input, or an image input.

7. The method of claim 1, wherein the determining of the post event time period comprises determining the post event time period based on the time of the identified topic that is learned based on an interaction pattern of a content of at least one application among the one or more applications, a context of at least one application executed in the electronic device, features supported by at least one application, the one or more applications linked with the at least one application, or an external environment.

8. The method of claim 1,
wherein the time point corresponding to the time information is determined based on detecting the time information included in the user request and extracting the time point from at least one application using the time information, and
wherein the time information comprises at least one textual word of birthday, anniversary, or meeting, or at least one textual word from January to December, or any number indicating a year.

9. The method of claim 1, wherein the launching of the at least one among the one or more applications comprises displaying the at least one among the one or more applications at the post event time period.

10. The method of claim 1, wherein the detecting of the one or more topics comprises identifying the one or more topics by monitoring at least one of a user interest, a user profile, or a user activity.

11. The method of claim 1, wherein the identified topic includes e-commerce service, wherein the time point corresponding to the time information includes a deadline to buy, and wherein the time of the identified topic includes a time of a periodic sale event.

12. The method of claim 1, wherein the post event time period is further determined based on matching the user intent with external environmental information comprising online trends or weather.

13. An electronic device for processing a user request, the electronic device comprising:
a memory; and
a processor coupled to the memory and configured to:
detect one or more topics, wherein each of the one or more topics is related to a time and a context,
receive the user request,
analyze the user request to detect a user intent and time information,
identify a topic associated with the user intent among the one or more topics based on a context of the topic,
determine one or more applications matching at least one of the user intent or the identified topic associated with the user intent,
determine, based on the identified topic and match between the user intent and a weather forecast, a post event time period as a time before a time point corresponding to the time information, wherein the post event time period is determined in accordance with a time of the identified topic, and
launch at least one among the one or more applications at the post event time period,
wherein the launching of the at least one among the one or more applications comprises launching the at least one among the one or more applications during multiple occasions prior to the time point corresponding to the time information and close to the time point corresponding to the time information.

14. The electronic device of claim 13, wherein the processor is further configured to provide one or more responses to a user based on the user intent at the post event time period.

15. The electronic device of claim 13, wherein the launching of the at least one among the one or more applications comprises launching the at least one among the one or more applications based on an occurrence of an event extracted from the analyzing of the user request.

16. A non-transitory computer readable medium configured to store one or more computer programs including instructions that, when executed by at least one processor, cause the at least one processor to control for:
learning one or more topics by an electronic device, wherein each of the one or more topics is related to a time and a context;
receiving a user request;
analyzing the user request to detect a user intent and time information;
identifying a topic associated with the user intent among the one or more topics based on a context of the topic;
determining one or more applications matching at least one of the user intent or the identified topic associated with the user intent;
determining, based on the identified topic and matching between the user intent and a weather forecast, a post event time period as a time before a time point corresponding to the time information, wherein the post event time period is determined in accordance with a time of the identified topic; and
launching at least one among the one or more applications at the post event time period,
wherein the launching of the at least one among the one or more applications comprises launching the at least one among the one or more applications during multiple occasions prior to the time point corresponding to the time information and close to the time point corresponding to the time information.

* * * * *